(12) United States Patent
Tomasi et al.

(10) Patent No.: US 9,019,719 B2
(45) Date of Patent: Apr. 28, 2015

(54) ELECTRICAL DEVICES MODULE FOR AN AVIONICS BAY

(71) Applicant: Airbus Operations (SAS), Toulouse (FR)

(72) Inventors: Marc Tomasi, Toulouse (FR); Matthieu De Kergommeaux, Toulouse (FR); Laurent Bertandeau, Tournefeuille (FR); Christian Banis, Leguevin (FR)

(73) Assignee: Airbus Operations SAS, Toulouse (FR)

( * ) Notice: Subject to any disclaimer, the term of this patent is extended or adjusted under 35 U.S.C. 154(b) by 142 days.

(21) Appl. No.: 13/623,137

(22) Filed: Sep. 20, 2012

(65) Prior Publication Data

US 2013/0077279 A1 Mar. 28, 2013

(30) Foreign Application Priority Data

Sep. 22, 2011 (FR) ...................................... 11 58464

(51) Int. Cl.
  *H05K 7/02* (2006.01)
  *B64D 43/00* (2006.01)
  *B64C 1/20* (2006.01)
  *B64C 1/22* (2006.01)

(52) U.S. Cl.
  CPC . *B64D 43/00* (2013.01); *B64C 1/20* (2013.01); *B64C 1/22* (2013.01)

(58) Field of Classification Search
  USPC ............ 361/807, 808, 829; 244/118.1, 137.1, 244/118.2, 117 R, 119, 120, 173.1, 129.2, 244/135 B, 136, 131, 127; 137/899.2; 410/66, 67, 68, 35, 46, 80, 82, 84, 92, 410/96, 52
  See application file for complete search history.

(56) References Cited

U.S. PATENT DOCUMENTS

| | | | | |
|---|---|---|---|---|
| 2,938,686 A * | 5/1960 | Lohstreter et al. | ......... | 244/118.1 |
| 3,307,080 A | 2/1967 | Cody | | |
| 3,753,541 A * | 8/1973 | Grueber et al. | ............ | 244/137.1 |
| 4,153,225 A * | 5/1979 | Paulsen | ...................... | 244/118.1 |
| 4,667,094 A * | 5/1987 | Van-Hecke et al. | ........ | 250/223 R |
| 5,092,541 A * | 3/1992 | Tofflemire et al. | ......... | 244/118.1 |
| 5,348,482 A * | 9/1994 | Rudy et al. | ...................... | 439/61 |
| 5,464,461 A * | 11/1995 | Whitson et al. | .................. | 55/480 |
| 5,949,656 A | 9/1999 | Pinault | | |
| 6,824,338 B2 * | 11/2004 | Looker | .......................... | 410/67 |
| 7,325,772 B1 * | 2/2008 | Hanewinkel et al. | ...... | 244/129.4 |
| 7,913,950 B2 * | 3/2011 | Huber | ........................ | 244/118.1 |
| 8,810,999 B2 * | 8/2014 | Guering | ....................... | 361/627 |
| 2002/0005150 A1 * | 1/2002 | Taylor et al. | ................ | 108/51.11 |
| 2003/0036347 A1 * | 2/2003 | Lambiaso | ...................... | 454/184 |
| 2006/0082970 A1 * | 4/2006 | Walz et al. | ..................... | 361/699 |
| 2007/0236881 A1 * | 10/2007 | Harder et al. | .................. | 361/695 |
| 2010/0048202 A1 * | 2/2010 | Beacham et al. | ............. | 455/431 |
| 2010/0188831 A1 * | 7/2010 | Ortet | ............................. | 361/788 |
| 2011/0127379 A1 * | 6/2011 | Jager et al. | ................. | 244/118.1 |
| 2011/0194269 A1 | 8/2011 | Colongo et al. | | |
| 2011/0198445 A1 * | 8/2011 | Colongo et al. | ............. | 244/131 |
| 2012/0298337 A1 * | 11/2012 | Tiwari et al. | ............. | 165/104.26 |

FOREIGN PATENT DOCUMENTS

DE 10333353 11/2007

* cited by examiner

Primary Examiner — Hung S Bui
Assistant Examiner — Michael Matey
(74) Attorney, Agent, or Firm — Greer, Burns & Crain Ltd.

(57) ABSTRACT

A module in the form of a pallet or a closed container includes a grouping together of the electrical devices in an avionics bay, in which the electrical devices are interconnected and attached so as to facilitate the mounting and thus limit the time it takes to mount the electrical devices in the avionics bay.

6 Claims, 3 Drawing Sheets

ELECTRICAL DEVICES MODULE FOR AN AVIONICS BAY

BACKGROUND OF THE INVENTION

The present invention relates to the aeronautical field and, more particularly, the mounting of electrical devices in a bay of an airplane.

The front portion of an airplane conventionally comprises a bay in which is located, for example, the cockpit of the airplane. This bay comprises an assembly of electrical devices solidly linked to the structure of the airplane and electrically connected to an electrical harness mounted in the structure of the airplane. As an example, the electrical devices may take the form of electrical cores, electronic racks or relay boxes.

Currently, the different electrical devices are mounted and connected individually in the avionics bay which results in a large number of handling operations on the part of the operators and lengthens the mounting time. Moreover, the mounting area of the avionics bay is a critical area in which a large number of operators move around and it is therefore important to limit as far as possible the period of presence of operators in this area. Furthermore, since the space is limited in the avionics bay, it is necessary to handle each device with caution in order not to damage it, which is a drawback.

Once an electrical device is structurally attached to the airplane, it has to be supplied with power and connected to the other devices and equipment of the airplane. To this end, each device comprises individual electrical connections which, by way of example, take the form of connectors and terminal lugs. The electrical connection of each electrical device is a lengthy task because of the number of electrical devices to be connected, and difficult given the small space available for the operators in the avionics bay.

SUMMARY OF THE INVENTION

In order to eliminate at least some of these drawbacks, the invention proposes grouping together the electrical devices in an avionics bay in the form of a module in which the electrical devices are interconnected and attached so as to facilitate the mounting and thus limit the time it takes to mount the electrical devices in the avionics bay.

According to the present invention, the module is a pallet or a closed container. Thus, the electrical devices can be attached and electronically connected together outside the avionics bay, that is to say, in a non-critical mounting area. Then, the module is solidly mounted in the avionics bay and electrically connected thereto. This advantageously makes it possible to limit the time that the operators are present in the avionics bay given that a large proportion of the attachment and electrical connection operations have been performed outside the airplane, that is to say, outside of the critical mounting area. The time it takes to install the electrical devices is considerably reduced during the assembly of an airplane.

Advantageously, the electrical devices can be connected fluidically together outside the avionics bay to ensure their ventilation. This makes it possible advantageously to limit the time that the operators are present in the avionics bay given that a large proportion of the fluidic connection operations are carried out outside of the airplane, that is to say, outside of the critical mounting area. The time it takes to install the electrical devices is considerably reduced during the assembly of an airplane.

The invention, in its first aspect, relates to a pallet mountable in an avionics bay of an aircraft, wherein the pallet comprises a plurality of electrical devices fixed therein, each electrical device having at least one individual electrical connection, which in use, is connected to the avionics bay, the pallet comprising at least one electrical interconnection, which in use, electrically connects at least two individual electrical connections of the electrical devices together and one of the individual electrical connections to the avionics bay. Therefore, an existing electrical connection of one of the devices is advantageously used to connect the pallet to the avionics bay, no additional electrical connection being necessary.

Such a pallet advantageously makes it possible to transport the devices solidly attached. Furthermore, a pallet is simple to fix to the horizontal floor of the avionics bay, the vertical links between the pallet and the avionics bay are advantageously limited.

Advantageously, each electrical device of the pallet has at least one individual ventilation connection, which in use, is fluidically connected to the avionics bay, wherein the pallet comprises at least one ventilation interconnection, which in use, fluidically connects at least two individual ventilation connections of the electrical devices together and one of the individual ventilation connections to the avionics bay.

The invention, in its second aspect, relates to a closed container mountable in an avionics bay of an aircraft, wherein the closed container comprises a plurality of electrical devices housed therein, each electrical device having at least one individual electrical connection, which in use, is connected to the avionics bay, the closed container comprising at least one electrical interconnection, which is use, electrically connects at least two individual electrical connections of the electrical devices together and one of the individual electrical connections to the avionics bay. Therefore, an existing electrical connection of one of the devices is advantageously used to connect the closed container to the avionics bay, no additional electrical connection being necessary.

Such a container makes it possible, on the one hand, to secure access to the electrical devices and, on the other hand, to avoid damaging them.

Advantageously, each electrical device of the closed container has at least one individual ventilation connection, which in use, is fluidically connected to the avionics bay, wherein the closed container comprises at least one ventilation interconnection, which in use, fluidically connects at least two individual ventilation connections of the electrical devices together and one of the individual ventilation connections to the avionics bay.

Preferably, the closed container is organized to form a ventilation volume for the electrical devices. The volume of the container advantageously makes it possible to participate in the cooling of the devices. Preferably, the container is maintained at a determined ventilation temperature.

The invention also relates to an airplane comprising an avionics bay in which is mounted a pallet or a closed container as previously described. Such an airplane advantageously has a reduced assembly mounting time.

BRIEF DESCRIPTION OF THE DRAWINGS

The invention will be better understood on reading the following description, given solely as an example, and by referring to the appended drawings in which.

DETAILED DESCRIPTION OF THE PREFERRED EMBODIMENTS

Figure 1:
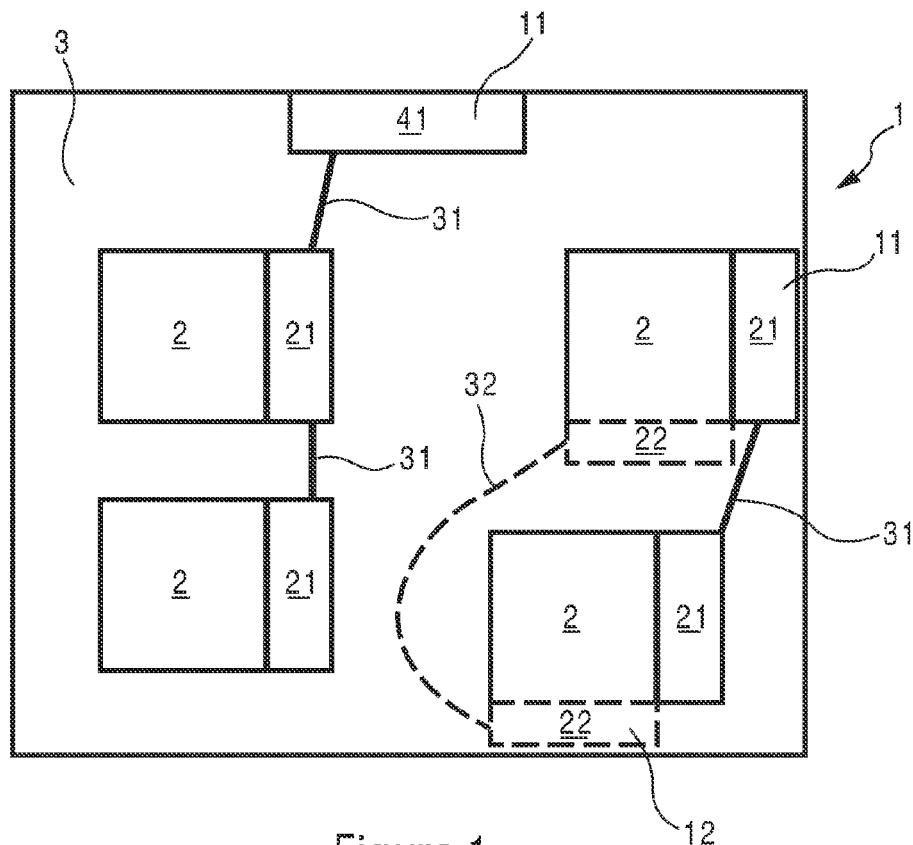
FIG. 1 is a schematic view of a module according to the invention comprising a plurality of electrical devices.

With reference to FIG. 1, electrical devices 2 of an avionics bay are grouped together in a module 1 in order to facilitate the mounting of the devices 2 in an avionics bay. As an example, the electrical devices 2 may take the form of electrical cores, electronics racks, relay boxes or similar items.

In order to facilitate the attachment of the electrical devices 2 to the avionics bay, the electrical devices 2 are, firstly, solidly linked to the structural support, this structural support being, secondly, solidly linked to the avionics bay. In other words, the electrical devices 2 are linked indirectly to the avionics bay.

With reference to FIG. 1 schematically representing a module 1 according to the invention, the module 1 comprises a structural support 3 on which a plurality of electrical devices 2 are solidly mounted. The devices 2 are definitively fixed onto the structural support 3 by operators. The fixing of the devices 2 is quick and easy given that it is carried out outside of the avionics bay.

Still referring to FIG. 1, each electrical device 2 has an individual electrical connection 21 suitable for directly connecting to the avionics bay, preferably, to an electrical harness connected in the avionics bay. The expression "electrical connection" should be understood to mean both a connection intended for the powering of the electrical device 2 and a connection intended for data transfer.

The module 1 has an electrical interconnection 31 electrically connecting the individual electrical connections 21 of the electrical devices 2. Thus, the electrical devices 2 can be connected together in the module 1 outside of the avionics bay which is advantageous. To electrically connect the module 1 to the avionics bay, the module 1 advantageously comprises at least one electrical interface 11. Only the electrical interfaces 11 of the module 1 have to be linked in the avionics bay which provides a time saving, the electrical interface advantageously making it possible to pool a number of individual electrical connections 21.

According to a first embodiment, the electrical interface 11 takes the form of an individual electrical connection 21 of one of the electrical devices 2 of the module 1. Thus, when a number of individual electrical connections 21 are linked by an electrical interconnection 31, it is sufficient to link one of the individual electrical connections 21 to the avionics bay to power all the electrical devices 2.

According to a second embodiment, the electrical interface 11 takes the form of a modular electrical connection 41 to which a plurality of individual electrical connections 21 are connected, the modular electrical connection 41 pooling the individual electrical connections 21 so as to facilitate the connecting of the module 1 in the avionics bay.

Similarly, still with reference to FIG. 1, two electrical devices 2 each comprise an individual ventilation connection 22. In this example, each individual ventilation connection 22, in this example, takes the form of an air extraction port and allows for the ventilation of the electrical/electronic components of the devices 2. The functional module 1 also comprises a ventilation interconnection 32 linking two individual ventilation connections 22 of the electrical devices 2. Thus, when a number of individual ventilation connections 22 are linked by a ventilation interconnection 32, it is sufficient to link one of the individual ventilation connections 22 to the avionics bay to ventilate all the electrical devices 2.

The functional module 1 also comprises a ventilation interface 12, here a general air extraction port, to which are linked the individual ventilation connections 22 of the electrical devices 2. The air extraction ports of the devices 2 are linked to the general air extraction port 12 of the module 1 in order to facilitate the ventilation of the devices 2 in the avionics bay. It goes without saying that an individual ventilation connection 22 of one of the devices 2 could also be used as the ventilation interface 12 of the module 1.

The module 1 according to the invention makes it possible to make a small number of electrical/fluidic connections once the module 1 is mounted in the avionics bay which provides a time saving when assembling the airplane. The devices 2 are advantageously prewired and preconnected outside of the avionics bay.

The structural support 3 may take various forms to solidly link the devices 2 together. According to a first embodiment, with reference to FIGS. 2 to 3, the structural support 3 takes the form of a pallet 4 on which the electrical devices 2 are mounted to form the module 1. The dimensions of the pallet 4 can be standardized or defined according to the devices 2 mounted on the pallet 4. Preferably, the dimensions of the pallet 4 are as small as possible to reduce the weight of the module 1. Preferably, the volume of the pallet is less than the overall volume of the electrical devices.

Figure 2:
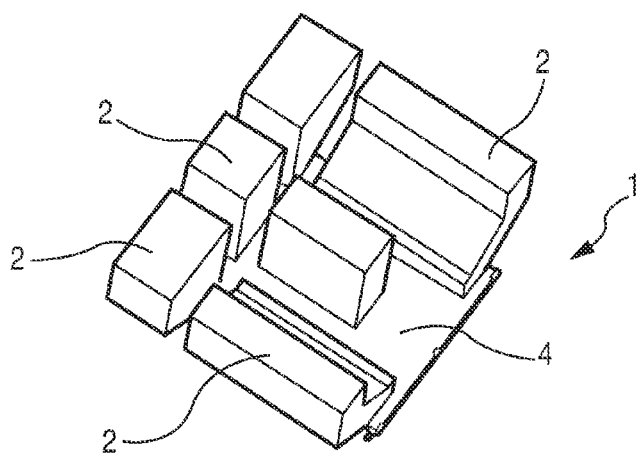
FIG. 2 is a perspective view of a first embodiment of a functional module according to the invention.

As represented in FIG. 2, the electrical devices 2 extend at least partially beyond the surface of the pallet 4 in order to limit the dimensions of the pallet 4 which lightens the weight of the module 1. Advantageously, such a module 1 generates little or no increase in weight compared to the prior art in which the devices 2 are mounted individually.

Figure 3:
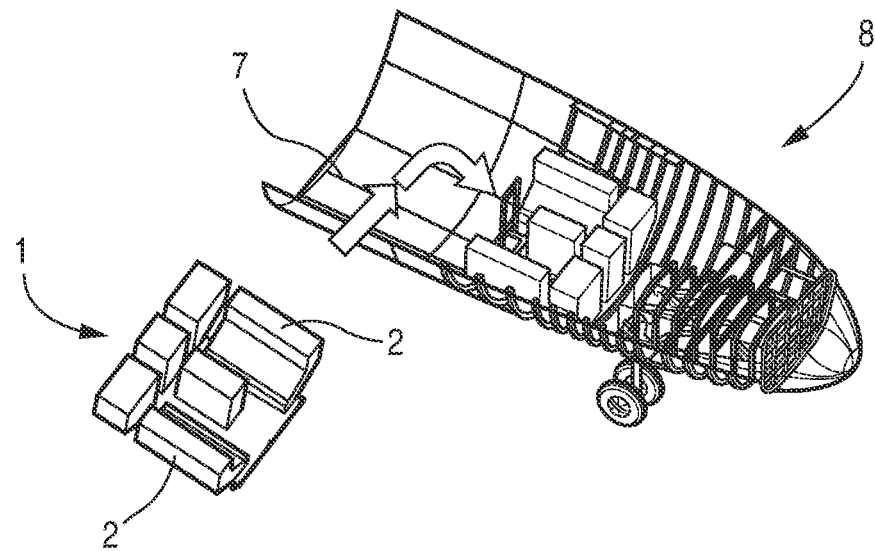
FIG. 3 represents a step in the mounting of the functional module of FIG. 2 in the avionics bay through the cargo door of the airplane.

As represented in FIG. 3, the module 1 with its pallet 4 can be mounted in an avionics bay 8 by introducing it through a cargo door 7 of the airplane. Advantageously, the dimensions of the pallet 4 are defined to allow for the introduction of the module 1 through the cargo door 7. Once the module 1 is mounted in the avionics bay 8, the pallet 4 is solidly fixed to the avionics bay 8 in order to prevent any movement of the pallet 4. Preferably, link rods can be used to link the module 1 to the avionics bay 8, the link rods preferably being attached to the electrical devices 2. The electrical connection and the ventilation of the devices 2 of the module 1 are easy, only the electrical 11 and ventilation 12 interfaces having to be connected to the avionics bay 8.

Figure 4:
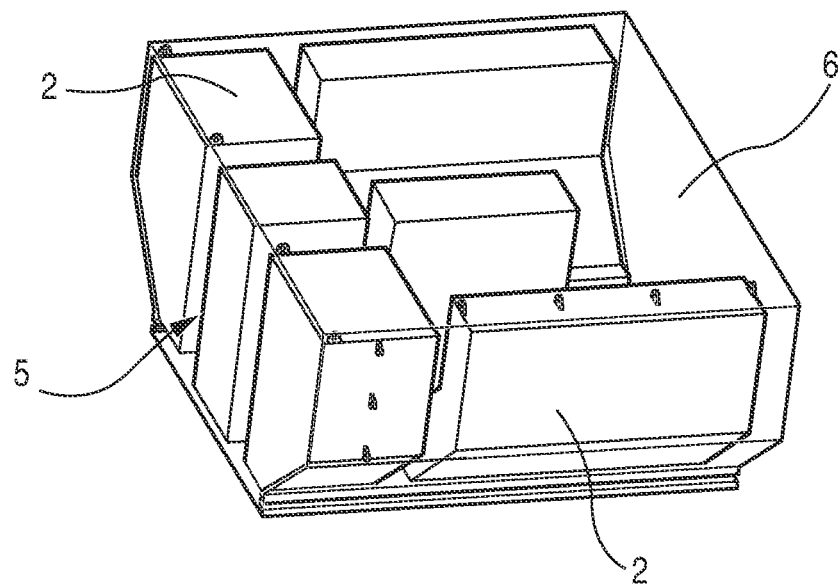
FIG. 4 is a perspective view of a second embodiment of a functional module according to the invention.
Figure 5:
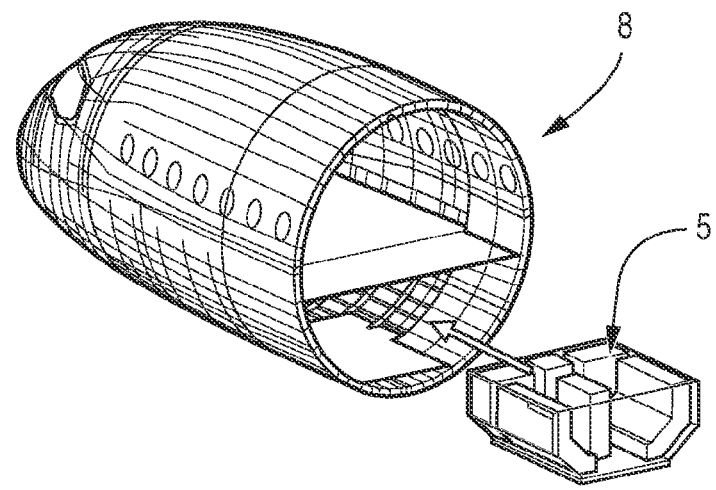
FIG. 5 represents a step in the mounting of the functional module of FIG. 4 in the avionics bay by translation from the open rear face of the avionics bay.
Figure 6:
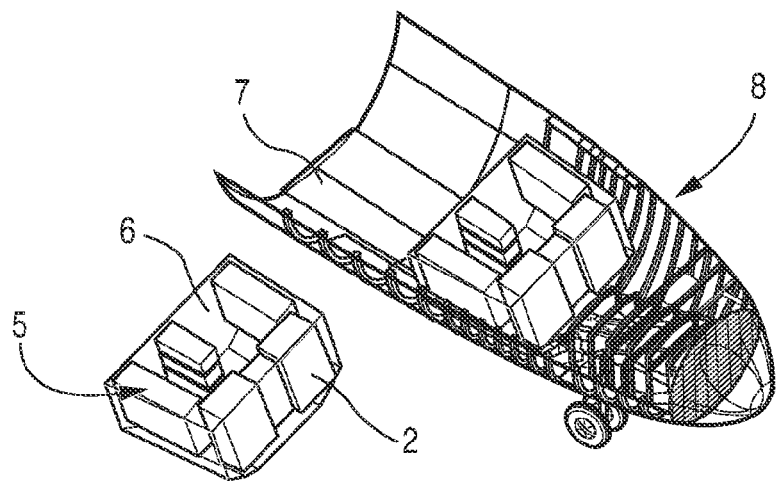
FIG. 6 represents a step in the mounting of the functional module of FIG. 4 in the avionics bay through the cargo door of the airplane.

According to a second embodiment, with reference to FIGS. 4 to 6, the structural support 3 takes the form of a container 5 in which the electrical devices 2 are mounted to form the module 1. Preferably, the container 5 is a container of the AKH type having a length on the order of 2.4 m, a width on the order of 1.5 m and a height on the order of 1.2 m for a volume on the order of 3.6 m$^3$. In another preferable size, the width of the container is on the order of 2.1 m.

With reference to FIG. 4, the container 5 comprises enclosing walls 6 delimiting a closed volume in which the electrical devices 2 are housed. In this example, the container 5 has a parallelepipedal form preventing direct access to the electrical devices 2 by an operator. Preferably, the container 5 includes means of access to the electrical devices 2, preferably a door that can be locked. Thus, access by unauthorized operators can be prohibited to improve security when using the airplane.

Preferably, the closed container 5 is organized to form a ventilation volume for the electrical devices 2. To this end, the container 5 has a ventilation inlet and a ventilation outlet (not represented) suitable for having an air flow circulate, preferably at a determined temperature in the container 5. Preferably, the ventilation interface 12 of the module 1 is used to allow for the circulation of the flow of air.

In a manner similar to the pallet 4, the container 5 can be mounted in the avionics bay 8 by introducing it through the cargo door 7 of the airplane as represented in FIG. 6, but it goes without saying that the container 5 can also be introduced into the avionics bay 8 through an open face of the avionics bay 8 as represented in FIG. 5. Once the module 1 is mounted in the avionics bay 8, the container 5 is solidly fixed to the avionics bay 8 in order to prevent its movement. In a manner similar to the pallet 4, link rods can be used to link the module 1 to the avionics bay 8. The electrical connection and the ventilation of the devices 2 of the module 1 are easy, only the electrical 11 and ventilation 12 interfaces having to be connected to the avionics bay 8.

It goes without saying that the structural support 3 on which the electrical devices 2 are mounted can take various other forms.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A pallet mountable in an avionics bay of an aircraft, wherein the pallet comprises a plurality of electrical devices fixed therein, each electrical device having at least one individual electrical connection, which in use, is connected to the avionics bay, the pallet comprising at least one electrical interconnection, which in use, electrically links at least two independent, individual electrical connections of the electrical devices together for providing electrical power and data transfer between all linked devices being commonly conjoined using the at least one electrical interconnection as a subset of the plurality of electrical devices,
  wherein a first electrical device of the linked devices in the subset is directly connected solely to a second electrical device of the linked devices without being directly connected to the avionics bay, and the linked devices in the subset are serially provided with the electrical power and the data transfer.

2. The pallet of claim 1, wherein each electrical device has at least one individual ventilation connection, which in use, is fluidically connected to the avionics bay, wherein the pallet comprises at least one ventilation interconnection, which in use, fluidically connects at least two individual ventilation connections of the electrical devices together and one of the individual ventilation connections to the avionics bay.

3. A closed container mountable in an avionics bay of an aircraft, wherein the closed container comprises a plurality of electrical devices housed therein, each electrical device having at least one individual electrical connection, which in use, is connected to the avionics bay, the closed container comprising at least one electrical interconnection, which in use, electrically links at least two independent, individual electrical connections of the electrical devices together for providing electrical power between all linked devices being commonly conjoined using the at least one electrical interconnection as a subset of the plurality of electrical devices,
  wherein a first electrical device of the linked devices in the subset is directly connected solely to a second electrical device of the linked devices without being directly connected to the avionics bay, and the linked devices in the subset are serially provided with the electrical power.

4. The closed container of claim 3, wherein each electrical device has at least one individual ventilation connection, which in use, is fluidically connected to the avionics bay, wherein the closed container comprises at least one ventilation interconnection, which in use, fluidically connects at least two individual ventilation connections of the electrical devices together and one of the individual ventilation connections to the avionics bay.

5. An airplane comprising an avionics bay in which is mounted a pallet, wherein the pallet comprises a plurality of electrical devices fixed therein, each electrical device having at least one individual electrical connection connected to the avionics bay, the pallet comprising at least one electrical interconnection electrically linking at least two independent, individual electrical connections of the electrical devices together for providing electrical power and data transfer between all linked devices being commonly conjoined using the at least one electrical interconnection as a subset of the plurality of electrical devices,
  wherein a first electrical device of the linked devices in the subset is directly connected solely to a second electrical device of the linked devices without being directly connected to the avionics bay, and the linked devices in the subset are serially provided with the electrical power and the data transfer.

6. An airplane comprising an avionics bay in which is mounted a closed container, wherein the closed container comprises a plurality of electrical devices housed therein, each electrical device having at least one individual electrical connection connected to the avionics bay, the closed container comprising at least one electrical interconnection electrically linking at least two independent, individual electrical connections of the electrical devices together for providing electrical power between all linked devices being commonly conjoined using the at least one electrical interconnection as a subset of the plurality of electrical devices,
  wherein a first electrical device of the linked devices in the subset is directly connected solely to a second electrical device of the linked devices without being directly connected to the avionics bay, and the linked devices in the subset are serially provided with the electrical power.

* * * * *